United States Patent [19]
Canevari

[11] 3,959,134
[45] May 25, 1976

[54] OIL COLLECTION AGENTS AND THEIR USE IN CONTAINING OIL SLICKS

[75] Inventor: Gerard P. Canevari, Cranford, N.J.

[73] Assignee: Exxon Research and Engineering Company, Linden, N.J.

[22] Filed: Feb. 18, 1975

[21] Appl. No.: 550,511

Related U.S. Application Data

[63] Continuation-in-part of Ser. No. 453,014, March 19, 1974, abandoned.

[52] U.S. Cl. .......................... 210/59; 210/DIG. 27; 252/312
[51] Int. Cl.$^2$ .......................................... C02B 9/02
[58] Field of Search................ 210/59, DIG. 21, 40; 252/60, 312, 314, 351–358

[56] References Cited
UNITED STATES PATENTS

| | | | |
|---|---|---|---|
| 2,447,551 | 8/1943 | Zisman et al. ............... | 210/DIG. 21 |
| 3,810,835 | 5/1974 | Ferm ..................... | 210/59 |

FOREIGN PATENTS OR APPLICATIONS

| | | | |
|---|---|---|---|
| 1,280,259 | 7/1972 | United Kingdom ...... | 210/DIG. 21 C |

OTHER PUBLICATIONS

Naval Research Laboratory Report No. P–1930, W. A. Zisman, Sept., 1942.

Naval Research Laboratory Report No. P–1984, W. A. Zisman, Jan., 1943.

*Primary Examiner*—Thomas G. Wyse
*Attorney, Agent, or Firm*—Frank A. Santoro

[57] ABSTRACT

Mixtures of $C_{10}$–$C_{20}$ aliphatic carboxylic acids or the sorbitan monoesters thereof, sorbitan monoacrylates in combination with nonpolar solvent systems are effective oil collecting agents for containing oil slicks floating on a water surface. The invention, therefore, describes a method whereby oil slicks floating on a water surface may be contracted by applying to the perimeter of the oil slick an effective amount of an oil collection agent as described above, whereby the surface area of said oil slick is reduced. After the size of the oil slick is reduced by means of the oil collection agent, the oil may then be physically removed from the water. An advantage of treating oil slicks in this manner is that the method aids in the removal of the oil completely from the water. The oil collection agents encompassed by the present invention have the additional advantages of having low toxicities as well as pour points low enough to enable their use during operations where water and/or air temperatures are less than 45°F.

13 Claims, No Drawings

OIL COLLECTION AGENTS AND THEIR USE IN CONTAINING OIL SLICKS

CROSS-REFERENCE TO RELATED APPLICATION

This application is a Continuation-In-Part application of U.S. Ser. No. 453,014 filed March 19, 1974, now abandoned.

BACKGROUND OF THE INVENTION

The present invention relates to oil collection agents which are used in a process to contract and collect oil slicks from a thin oil film occupying a large area of the water surface to a thicker oil film occupying a substantially smaller area of said water surface. This method enables the physical removal of the oil from the water and hence is desirable.

Water pollution, occasioned by the discharge of oil into water, results in the formation of oil slicks and is a well-known hazard. A highly visible film having an area of about one square mile can be formed with only fifty gallons of oil. Such oil slicks or films are undesirable not only from an aesthetic standpoint but also because cohesive oil films represent a barrier to the transfer of oxygen from the atmosphere to support marine life, a serious hazard to marine fowl as well as a serious shore contaminant.

The pollution of water by oil slicks is sometimes inadvertently occasioned by discharge of ballast water from oil tankers or from offshore drilling operations or from tanker collisions. Various techniques have been devised for solving these oil contamination problems. One solution is related to the use of detergents to emulsify the oil with the water; also dispersants for dispersing the oil with water have been suggested. However, the use of strong detergents has resulted in severe damage to marine life and the dispersants, while generally nontoxic, are not always proven effective for dispersing highly viscous seaborne oil slicks. At the present time, the use of dispersants to disperse oil slicks is a subject of study by various government regulatory agencies. This study has precluded the use of said dispersants in inland waterways. The various regulatory agencies concerned with water pollution occasioned by oil slicks would seemingly be desirous of a method which aids in the complete removal of the oil from the water.

PRIOR ART

The concept of using oil collection agents dates back to research by the Naval Research Lab in 1943 which was the subject of further research in 1959. In U.S. Pat. No. 2,447,551 by Zisman et al., a method of clearing water surfaces of oil is described. The method comprises surrounding the oil slick with a material selected from the group consisting of liquid esters of fatty acids and hydroxy compounds selected from the group consisting of sugars and sugar derivatives. The patentees point out that the use of these compounds provides effective repelling of the oil at temperatures as low as 40°F.

More recently, a product marketed by a petroleum company has received considerable publicity in the treatment of minor oil spills. The Shell "Oil Herder" is described as a new type of oil spill control and clean-up agent for use on inland waterways and open seas. The company brochures describe the action of its "Oil Herder" as follows: Immediately upon application, "Oil Herder" forms an extremely thin layer on the water surface that contains the oil spill and causes the slick to contract upon itself. The properties of Shell "Oil Herder" are such that its pour point approaches 45°F.

However, all of these prior art methods and materials have certain disadvantages. In general, they exhibit relatively higher toxicity to marine life when compared with the present invention oil collection agents.

COMPARISON OF TOXICITY TEST RESULTS

| OIL COLLECTION AGENT | FRESH WATER TLm,PPM 48 Hr. | FRESH WATER TLm,PPM 96 Hr. | SALT WATER TLm,PPM 48 Hr. | SALT WATER TLm,PPM 96 Hr. |
|---|---|---|---|---|
| SHELL HERDER SORBITAN MONOOLEATE + | 250 | 205 | | 705 |
| HEXYL ALCOHOL SORBITAN MONOOLEATE + | | | 175 | 150 |
| TRIDECYL ALCOHOL | 86 | 12 | 89 | 89 |
| APPLICANT'S MATERIAL | 6450 | 6100 | 5250 | 5250 |

NOTES:
(1) Toxicity test conducted as per U.S. EPA recommended procedure (Report No. EPA-R2-73-201).
(2) TLm is the level of chemical concentration that causes 50% mortality of the test species for the time interval shown.
(3) Fresh water species was the Zebra (Brachydanio rerio). Salt water species was the Fundulus heteroclitus).

Additionally, pour point characteristics of these prior art materials makes them ineffective in situations where air temperatures approach 0°F. since an oil collection agent with a pour point greater than 0°F. presents handling, storage and application difficulties.

The effectiveness of oil collection agents may be demonstrated by the use of a device known as a film balance. This film balance device consists of a trough of water upon which the oil collection agent is placed. The molecules of the agent are seen to spread at random initially but with a distinct tendency to orient. When a barrier is moved so as to compress the surface film, a force is exerted against this fixed barrier that is measured by a torsion balance. A force versus area diagram can be used to measure the characteristics of the surface film. When the collapse or critical spreading pressure is attained, then the area occupied by the compact monolayer is measured. In essence, the spreading pressure is an apparent pressure to balance surface forces and can be represented by the formula: $P_c = S_o - S$ wherein $P_c$ is the critical or maximum spreading pressure expressed as dynes per centimeter; $S_o$ is the original surface tension before the addition of the surfactant (dynes per centimeter) and $S$ is the surface tension that is attained with a complete monolayer of the oil collection agent. This two-dimensional spreading pressure $P_c$ or spreading force is always expressed as dynes per centimeter of boundary, experiencing that force. The balance of forces during the containment of an oil film by an oil collection agent shows that the inherent spreading pressures of some oils may be as high as 30 dynes per centimeter.

While many oil collection agents exhibit spreading pressures in the range of 40 dynes per centimeter, which would make them effective as oil collecting agents, there are other important considerations in the formulation of a practical oil collection agent. These criteria are effectiveness, toxicity, pour point, flash point and formulation stability.

The characteristics of certain surface active agents, which are suitable for use as oil collection agents to film out on the surface of water to form a monolayer, are well documented. The monolayer formed by some surfactants exerts a spreading force on the surface that is great enough to confine and collect surface oil slicks. The spreading pressure of many surface active agents is known, the maximum value being approximately 45 dynes per centimeter.

However, it has been discovered unexpectedly that the effectiveness of a given surfactant to contain oil films can be changed significantly based on the selection of the proper solvent or vehicle to deliver the surfactant. This is important because there are basically two types of spreading behaviors observed, one which is described as Autophobic, the other is termed Duplex Film.

The first type of spreading behavior, i.e. Autophobic, is observed for chemical agents such as amyl alcohol which do not spread over themselves but rather remain as a lens on the water surface. A monolayer is formed and the alcohol molecules emanate from the lens; the lens is in a sense contained because nonpolar groups oriented upwards are not compatible with the more polar surfactant material, such as amyl alcohol. The latter, therefore, adheres to itself as a lens rather than spread over the nonpolar groups. Hence, the monolayer of such a surfactant is formed at a slower rate and the resulting spreading pressure is similarly developed slowly. In essence, the molecules of a surfactant such as amyl alcohol enter the monolayer only one at a time since the surfactant cannot deliver or carry them across the incompatible monolayer.

In contrast to the Autophobic spreading process it has been found that if a surface active agent is placed in a hydrocarbon vehicle or solvent, it can be delivered in the form of many monolayers or as a Duplex Film. In contrast to the above, the surfactant can then flow across the monolayer and in so doing, form a duplex film spreading more quickly than in the Autophobic mechanism. The spreading pressures exerted by the surfactant in the process of spreading as a duplex film are greater than the spreading pressures developed from a surfactant spreading as a monolayer in the autophobic mechanism. Hence, it has been unexpectedly discovered that the combination of particular surfactants and particular solvents is important in the selection of effective oil collecting agents which operate by the above Duplex Film method.

SUMMARY OF THE INVENTION

In accordance with the present invention, it has been found that oil slicks can be contracted and contained by contacting the perimeter of the oil slicks or the water surrounding said oil slicks with an oil collection agent comprising a mixture of $C_{10}$–$C_{20}$ aliphatic monocarboxylic acid or sorbitan monoester thereof in combination with a nonpolar solvent or a solvent package that is essentially nonpolar. The effective spreading caused by the spreading pressure of the oil collection agent thereby reduces the area of the oil slick in size and the oil may thereafter be destroyed or physically removed from the water.

Oil collection agents suitable for use in the present invention may broadly be described as an admixture of surfactants comprising $C_{10}$–$C_{20}$ aliphatic monocarboxylic acids or sorbitan monoesters thereof in a nonpolar solvent. Usable aliphatic carboxylic acids are straight or branched chain saturated and unsaturated acids containing about 10 to about 20 carbon atoms. Preferred acids are straight chain saturated and monoethylenically unsaturated aliphatic monocarboxylic acids containing 12–18 carbon atoms. Non-limiting representative of the examples of these acids include caproic acid, lauric acid, myristic acid, palmitic acid, stearic acid, oleic acid, monodecylic acid, etc. These acids can be represented by the following general formula: R—COOH wherein R is a $C_9$–$C_{19}$ straight chain, branched chain or cyclic monovalent alkyl or alkenyl radical, preferably a straight chain alkyl or alkenyl radical.

Sorbitan monoesters of aliphatic carboxylic acids of the present invention are formed by the reaction of an aliphatic carboxylic long chain saturated or unsaturated fatty acid with a mixture of polyalcohols formed by the dehydration of sorbitol. The dehydration of sorbitol to the intermediate sorbitan compound proceeds according to the following equations:

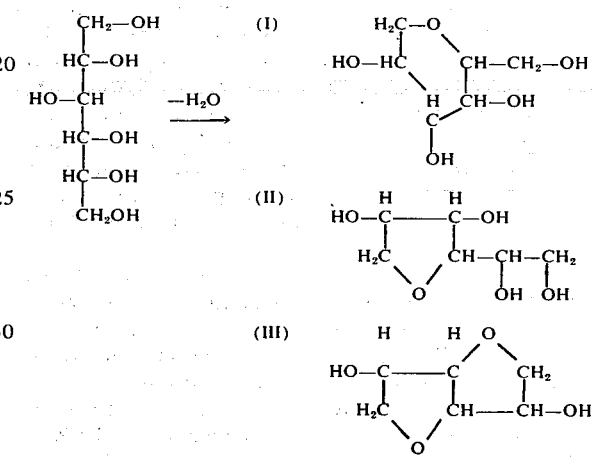

Products I, II and III are all formed during the dehydration reaction. Sorbitan monoesters are obtained by reacting the above compounds I, II or III or their mixture with a fatty acid according to the following equations:

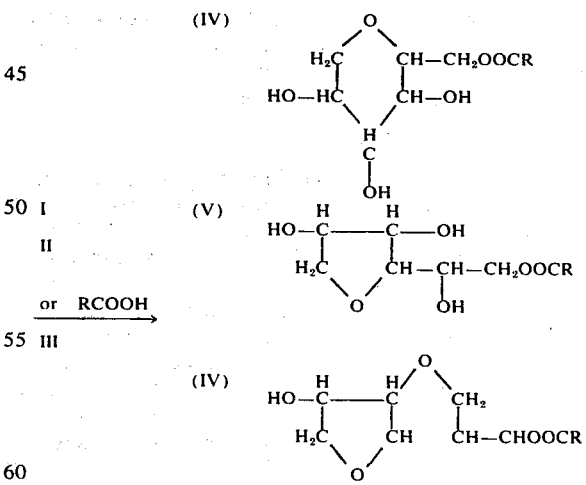

wherein R is as previously defined. As noted, the esterification reaction involving a long chain monocarboxylic acid is quite specific as only certain of the available hydroxyl groups on the sorbitan material is subjected to the esterification reaction. The term "sorbitan monoacylate" is meant to denote compounds IV, V and VI alone or in admixture. These compounds may be represented by the general formula:

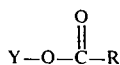

where R is as previously defined and Y is a monocyclic or bicyclic sorbitan radical (a sorbitan radical being defined as compounds I, II, III, the hydrogen atoms of one of the hydroxyl groups being removed).

Preferably the compounds employed are sorbitan monooleate (SPAN 80) and sorbitan monolaurate (SPAN 20) in admixture in amounts of from 35 to 40 wt. % of SPAN 80 and 3 to 7 wt. % of SPAN 20 based on total composition.

The nonpolar solvent system employed in the present invention can be broadly described as follows.

Any isoparaffinic hydrocarbon of high purity with a boiling range of about 240°–485°F and aromatic content of less than 1%. Such a material is marketed by Exxon Company, U.S.A. as Isopar series.

Similar generic types are sold as the following with the variation in boiling range noted:

| | | |
|---|---|---|
| Isopar E | Boiling Range | 240–290°F. |
| Isopar G | Boiling Range | 320–350°F. |
| Isopar H | Boiling Range | 350–375°F. |
| Isopar K | Boiling Range | 350–400°F. |
| Isopar L | Boiling Range | 373–406°F. |
| Isopar M | Boiling Range | 405–484°F. |

Preferably the isoparaffin employed is ISOPAR M and is present in amounts of 25 to 35 wt. % based on the total composition.

While other hydrocarbon-nonpolar solvents such as toluene, xylene, aromatic naphtha may be similarly effective in forming a duplex film, they are not used because of toxicity consideration.

However, the isoparaffinic solvent may be used in conjunction with a glycol ether such as the methyl, ethyl and n-butyl monoether of ethylene glycol. Such agents include products having the following trade names of Exxon Chemical:

| | |
|---|---|
| Methyl Jaysolve | ethylene glycol monomethyl ether |
| Ethyl Jaysolve | ethylene glycol monoethyl ether |
| Butyl Jaysolve | ethylene glycol monobutyl ether |

Also usable are the diglycol ethers such as

| | |
|---|---|
| Jaysolve DM | Diethylene Glycol Monomethyl Ether |
| Jaysolve DE | Diethylene Glycol Monoethyl Ether |
| Jaysolve DB | Diethylene Glycol Monobutyl Ether |

Preferably diethylene glycol monobutyl ether is the diglycol ether of choice and is used in amounts of from 20 to 30 wt. % based on total composition.

Oil slick containment can be achieved by spraying the oil collection agent at or near the perimeter of the oil slick. It is desirable that the oil collection agent be applied onto the water surface with a small diameter hose equipped with a spray nozzle to supply uniform fine spray for even distribution. When a sufficient period of time has elapsed, the oil slick will be contracted upon itself and may then be physically removed or destroyed completely from the surface of the water by burning, for example. The oil collection agents may be employed in the following effective amounts. A complete monolayer is formed at approximately 5 mg/m$^2$. However, for application losses and other contingencies 50 mg/m$^2$ is a recommended application rate. For producing a linear ban a mile long and 35 meters wide to collect or contract an oil slick, 2 gallons of collecting agent are recommended and this is the equivalent of 140 mg/m$^2$. The invention will now be described with reference to the following specific examples.

EXAMPLE 1

Using the film balance as described above, values of spreading pressures of some surface active agents and petroleum materials have been determined. These values are as listed below:

| Surface Active Agents | Spreading Pressure |
|---|---|
| Sorbitan monolaurate | 45.2 dynes/cm |
| Sorbitan monooleate | 42.2 dynes/cm |
| Sorbitan Trioleate 20 moles POE[1] | 40.0 dynes/cm |
| Heptadecanol | 19.6 dynes/cm |
| Oleic Acid | 30.0 dynes/cm |
| Decanol | 36.2 dynes/cm |
| Petroleum | |
| Light Refugio Crude Oil, Texas | 33.0 dynes/cm |
| Lago Crude, Venezuela | 28.1 dynes/cm |
| Navy Special Fuel Oil | 25.0 dynes/cm |
| Marine Diesel Fuel Oil | 26.0 dynes/cm |

[1]POE - polyoxyethylene

EXAMPLE 2

Using the following procedure, applicant's material was tested against known oil collection agents. 150 ml of South Louisiana crude is placed on the surface of water contained in a vessel approximately 56 cm in diameter. Applicant's material consisted of the following composition: sorbitan monooleate (SPAN 80) 40 wt. %, sorbitan monolaurate (SPAN 20) 5 wt. %, ISOPAR M 30 wt. % and diethylene glycol monobutyl ether 25 wt. %. After the oil spreads and comes to equilibrium, a drop (0.05 ml) of one test collecting agent is applied to the water surfaced at one edge of the pan. A drop in the second comparative test chemical is applied simultaneously at a location directly opposite the other test agent. The respective surface areas cleared by the chemicals are then recorded after 1, 5 and 30 minutes. The results of these tests are found in Table I below and show: Applicant's material cleared a much greater area of oil slick than Shell Herder as shown by Test A. Applicant's solvent system, i.e., ISOPAR M and diethylene glycol monobutyl ether, was used with Shell Herder and the improved performance can readily be seen by results of Test B. Tect C shows the improved performance of a solvent system employing Duplex Film mechanism. Tests D + E illustrate that the combination of Duplex Film spreading and surfactant selection provides applicant's material with its unique oil containing effectiveness.

TABLE I

| System | Type of Film | 1 Min. | 5 Min. | 30 Min. | So. La. Crude Test II |
|---|---|---|---|---|---|
| Applicant's material[1] | Duplex | 110 | 180 | 220 | A |
| Shell Herder (unmodified) | Autophobic | 20 | 10 | 8 | |
| Applicant's material | Duplex | 100 | 100 | | B |
| Shell Herder modified with Applicant's Solvent[2] | Duplex | 75 | 100 | | |
| Shell Herder (unmodified) | Autophobic | 1 | 1 | 0.5 | |
| | | | | | C |
| Shell Herder modified with Applicant's Solvent | Duplex | 60 | 160 | 210 | |
| Applicant's material | Duplex | 140 | 160 | 200 | |
| | | | | | D |
| N.R.L. (S-80 + $C_6OH$) | Autophobic | 1 | 0.5 | 0.5 | |
| Applicant's material | Duplex | 160 | 190 | 230 | |
| | | | | | E |
| N.R.L. modified with Applicant's Solvent | Duplex | .5 | 1.5 | .4 | |

[1] Composition comprising 40 wt. % sorbitan monooleate, 5 wt. % sorbitan monolaurate; 30 wt. % ISOPAR M and 25 wt. % diethylene glycol monobutyl ether.
[2] Solvent comprises ISOPAR M and diethylene glycol monobutyl ether.
S-80 = SPAN 80 (Sorbitan Monooleate)
$C_6OH$ = hexanol
NRL = Naval Research Lab formulation

What is claimed is:

1. A method of containing an oil slick on the surface of water which comprises applying to the water surface at the perimeter of said oil slick an effective amount of an oil collection agent comprising a surfactant selected from the group consisting of aliphatic monocarboxylic acids and sorbitan monoesters of aliphatic monocarboxylic acids having from $C_{10}$ to $C_{20}$ carbons and mixtures thereof, in combination with a glycol solvent selected from the group consisting of monoethylene monoalkyl glycol ethers and diethylene monoalkyl glycol ethers, and a nonpolar solvent selected from the group consisting of isoparaffinic hydrocarbons having a boiling point in the range of from about 240°F. to about 485°F.

2. The method of claim 1 wherein said surfactant is selected from the group consisting of caproic acid, lauric acid, myristic acid, palmitic acid, stearic acid, oleic acid, monodecylic acid, sorbitan monooleate and sorbitan monolaurate.

3. The method of claim 1 wherein said glycol solvent is selected from the group consisting of ethylene glycol monomethyl ether, ethylene glycol monoethyl ether, ethylene glycol monobutyl ether, diethylene glycol monomethyl ether, diethylene glycol monoethyl ether and diethylene glycol monobutyl ether.

4. The method of claim 1 wherein said oil collection agent comprises sorbitan monooleate, sorbitan monolaurate diethylene glycol monobutyl ether and isoparaffinic hydrocarbons having a boiling point in the range of from about 405°F. to about 484°F.

5. The method of claim 4 wherein said oil collection agent comprises about 35–45 wt. % sorbitan monooleate, about 3–7 wt. % sorbitan monolaurate, about 20–30 wt. % diethylene glycol monobutyl ether and about 25–35 wt. % isoparaffinic hydrocarbons having a boiling point in the range of from about 405°F. to about 484°F.

6. The method of claim 5 wherein said oil collection agent comprises 40 wt. % sorbitan monooleate, 5 wt. % sorbitan monolaurate, 25 wt. % diethylene glycol monobutyl ether and 30 wt. % isoparaffinic hydrocarbons having a boiling point in the range of from about 405°F. to about 484°F.

7. An oil collection agent for the containment of an oil slick on the surface of water which comprises:
   a. a surfactant selected from the group consisting of aliphatic monocarboxylic acids and sorbitan monoesters of aliphatic monocarboxylic acids having from $C_{10}$ to $C_{20}$ carbons and mixtures thereoof;
   b. a glycol solvent selected from the group consisting of monoethylene monoalkyl glycol ethers and diethylene monoalkyl glycol ethers; and
   c. a nonpolar solvent selected from the group consisting of isoparaffinic hydrocarbons having a boiling point in the range of from about 240°F. to about 485°F.

8. The oil collection agent of claim 7 wherein said surfactant is selected from the group consisting of caprioc acid, lauric acid, myristic acid, palmitic acid, stearic acid, oleic acid, monodecylic acid, sorbitan monooleate and sorbitan monolaurate.

9. The oil collection agent fo claim 7 wherein said glycol solvent is selected from the group consisting of ethylene glycol monomethyl ether, ethylene glycol monoethyl ether, ethylene glycol monobutyl ether, diethylene glycol monomethyl ether, diethylene glycol monoethyl ether and diethylene glycol monobutyl ether.

10. The oil collection agent of claim 7 comprising sorbitan monooleate, sorbitan monolaurate, diethylene glycol monobutyl ether and isoparaffinic hydrocarbons having a boiling point in the range of from about 405°F. to about 484°F.

11. The oil collection agent of claim 10 comprising about 35–45 wt. % sorbitan monooleate, about 3–7 wt. % sorbitan monolaurate, about 20–30 wt. % diethylene glycol monobutyl ether and about 25–35 wt. % isoparaffinic hydrocarbons having a boiling point in the range of from about 405°F. to about 484°F.

12. The oil collection agent of claim 11 comprising 40 wt. % sorbitan monooleate, 5 wt. % sorbitan monolaurate, 25 wt. % diethylene glycol monobutyl ether and 30 wt. % isoparaffinic hydrocarbons having a boiling point in the range of from about 405°F. to about 484°F.

13. A method of containing an oil slick on the surface of water which comprises applying to the water surface at the perimeter of said oil slick an effective amount of an oil collection agent comprising:
  a. a surfactant selected from the group consisting of aliphatic monocarboxylic acids and sorbitan monoesters of aliphatic monocarboxylic acids having from $C_{10}$ to $C_{20}$ carbons and mixtures thereof;
  b. a glycol solvent selected from the group consisting of monoethylene monoalkyl glycol ethers and diethylene monoalkyl glycol ethers; and
  c. a nonpolar solvent selected from the group consisting of isoparaffinic hydrocarbons having a boiling point in the range of from about 240°F. to about 485°F.

* * * * *